Aug. 14, 1956  E. J. DOWDEN  2,758,647
SPEED REGISTERING AND TABULATING APPARATUS
Filed Sept. 16, 1953  10 Sheets-Sheet 1

Inventor
Ernest J. Dowden,
By: Frederick F. Mason
Atty.

Aug. 14, 1956   E. J. DOWDEN   2,758,647
SPEED REGISTERING AND TABULATING APPARATUS
Filed Sept. 16, 1953   10 Sheets-Sheet 2

Fig. 5.

Inventor,
Ernest J. Dowden,
By: Frederick F. Mason
Atty.

Aug. 14, 1956  E. J. DOWDEN  2,758,647
SPEED REGISTERING AND TABULATING APPARATUS
Filed Sept. 16, 1953  10 Sheets-Sheet 4

Aug. 14, 1956  E. J. DOWDEN  2,758,647
SPEED REGISTERING AND TABULATING APPARATUS
Filed Sept. 16, 1953  10 Sheets-Sheet 7

Inventor,
Ernest J. Dowden,
By: Frederick F. Mason
Atty.

Fig. 19

United States Patent Office 2,758,647
Patented Aug. 14, 1956

2,758,647

SPEED REGISTERING AND TABULATING APPARATUS

Ernest J. Dowden, Ames, Iowa

Application September 16, 1953, Serial No. 380,496

14 Claims. (Cl. 161—18)

This invention relates to an improved apparatus for registering and tabulating speeds of various devices, and while particularly adapted for registering the speeds of automobiles, it is to be understood that it may also be used for registering speeds of such other devices to which it may be adapted.

The present invention is an improvement over that of U. S. Letters Patent No. 2,361,826, granted to me October 31, 1944, and of U. S. Letters Patent No. 2,657,749, granted to me November 3, 1953.

In carrying the present invention into practice, when used in connection with automobile speeds, a pair of parallel road switches will be positioned on the road or highway at a predetermined distance apart. When one of the front wheels of the automobile contacts the first road switch, the registering apparatus is instantly started in operation, and when said front wheel contacts the second road switch the registering apparatus is instantly stopped, the apparatus registering the speed in miles per hour the automobile was traveling as its front wheels passed from the first road switch to the second road switch. The operator of the apparatus may selectively operate it so that the indicator shaft will be held stationary after its rotation for the recording operation, so that the operator may at his leisure visually read the speed recorded on the dial and then manually release it for further operation, or if desired the apparatus may be operated successively without the presence of an operator and record the speeds of all automobiles passing from the first to the second road switches and make a record of how many automobiles so passed over the road switches, and at what speeds.

In the former of the last two mentioned selective operations, the apparatus will also simultaneously record on a series of counters, or indicators, the speed at which said automobile was travelling. In other words, the apparatus will register the speed of the passing vehicle and hold it on the dial, and also automatically tabulate that speed on a counter regardless of whether or not the speed is held on the dial.

In the present apparatus the parts, after being tripped by a front tire passing over the first road switch, will be automatically reset upon said front tire passing over the second road switch, so that the apparatus may be continuously operated without an attendant, and will automatically record how many vehicles passed from the first to the second road switches and at what speeds. While I have shown and described herein the tabulator or counter as being an electric counter, I wish it understood that the tabulator may be a graph, a printing attachment, or other form of recording means adapted to be operable by the mechanism disclosed herein, without departing from the spirit of my invention. Also the apparatus of the present invention may be used with means of activation other than road switches, such as electric eyes, magnets in the street, and the like.

Among the objects of my invention are: to provide a new and improved speed registering device; to provide a speed registering device that will accomplish the advantages herein set forth; to provide a speed registering device that in addition to indicating the speed of a vehicle passing from the first road switch to the second road switch, will also automatically tabulate the number of all vehicles passing from the first to the second road switches and the speeds of such vehicles; to provide a speed registering device that will selectively hold the pointer in the speed indicated position on the dial until read by the operator and simultaneously record such speed on a counter, and also that will be automatically operable for successive speed registering operations, without an attendant, by all vehicles passing from the first road switch to the second road switch, and record the number and speeds of all of said vehicles; to provide novel means for automatically resetting the various parts of the apparatus after a vehicle has passed from the first to the second road switch; to provide novel spring means for rotating the pointer shaft and obtaining uniform or constant speed rotation thereof; to provide novel means for preventing premature operation of the first road switch by the rear wheels of a vehicle having a long wheel base; to provide novel means for returning the pointer to zero reading position after the speed has been registered and tabulated; and such further objects, advantages and capabilities, inherently possessed by my invention, as will later more fully appear.

My invention further resides in the combination, construction and arrangement of parts illustrated in the accompanying drawings, and while I have shown therein preferred embodiments I wish it understood that the same are susceptible of modification and change without departing from the spirit of my invention.

In the drawings:

Fig. 18 is a vertical section on the line 18—18 of Fig. 17.

Figure 1:
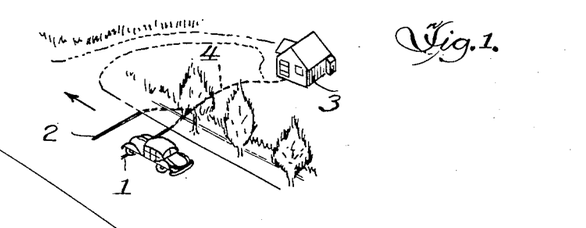
Fig. 1 is a perspective view of an automobile passing over a pair of spaced road switches which are wired to register the speed of the car from a distant and unobserved point.

In the form of my invention shown for illustrative purposes in the drawings, a pair of road switches 1 and 2 are laid in parallel relation to each other, and spaced apart, on the highway, with wires leading from the road switches to registering apparatus located out of sight in a building 3, the wiring thereto being indicated at 4. These road switches are of the same construction and operation as those shown and described in my Patent 2,657,749, and hence need not be again described in detail here. These road switches, which are shown diagrammatically in Fig. 2 of the present application, may be spaced apart any desired and precalculated distance, such distance in the present case being ten feet. In the present invention, when one of the front tires of a passing vehicle contacts the first road switch 1, see Fig. 1, an electric circuit is closed which energizes a solenoid which releases the tension in one bent flat spring and permits another bent flat spring to rotate the pointer shaft and pointer. When one of the front tires contacts the second road switch 2 other circuits will be closed to move the pointer shaft downwardly, and if desired lock the pointer shaft in its lowered position until manually released, operate counters to record the speed at which the vehicle was travelling between the two road switches, and to reset the apparatus and move the pointer back to zero. These operations, and the structures for enabling same to be carried out, will later herein be fully described and explained.

Supporting frame

Figures 2, 3, 4, 16:
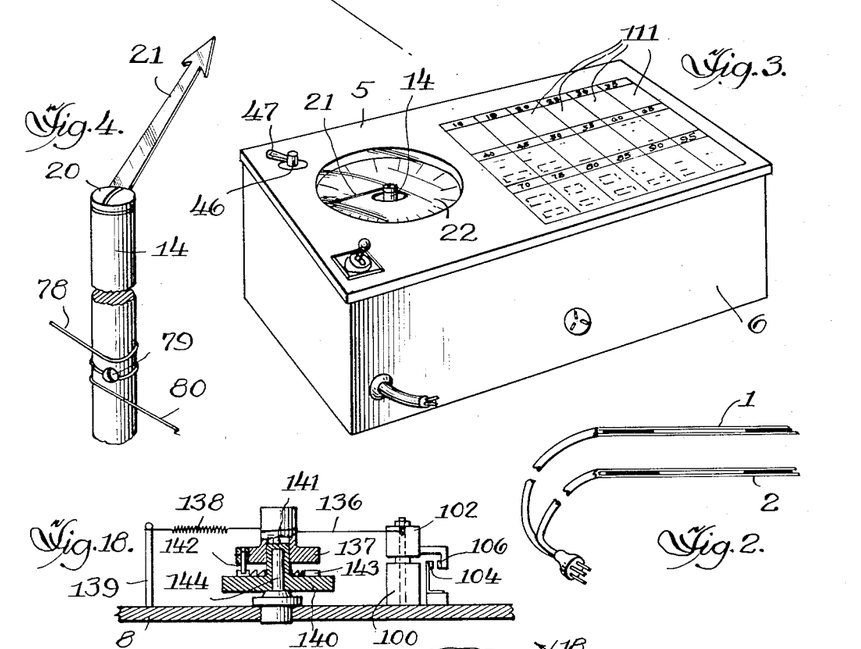
Fig. 2 is a fragmentary, diagrammatic view of a pair of spaced road switches and wiring therefrom to plug into a speed registering apparatus, the road switches forming part thereof.
Fig. 3 is a perspective view of a cabinet within which is housed speed registering and tabulating apparatus embodying my invention.
Fig. 4 is an enlarged, fragmentary, perspective view of the pointer shaft and pointer, and showing portions of the cords or wires attached thereto for rotating the same.
Fig. 16 is a circuit diagram, showing the various electrical circuits in one arrangement.
Figure 5:
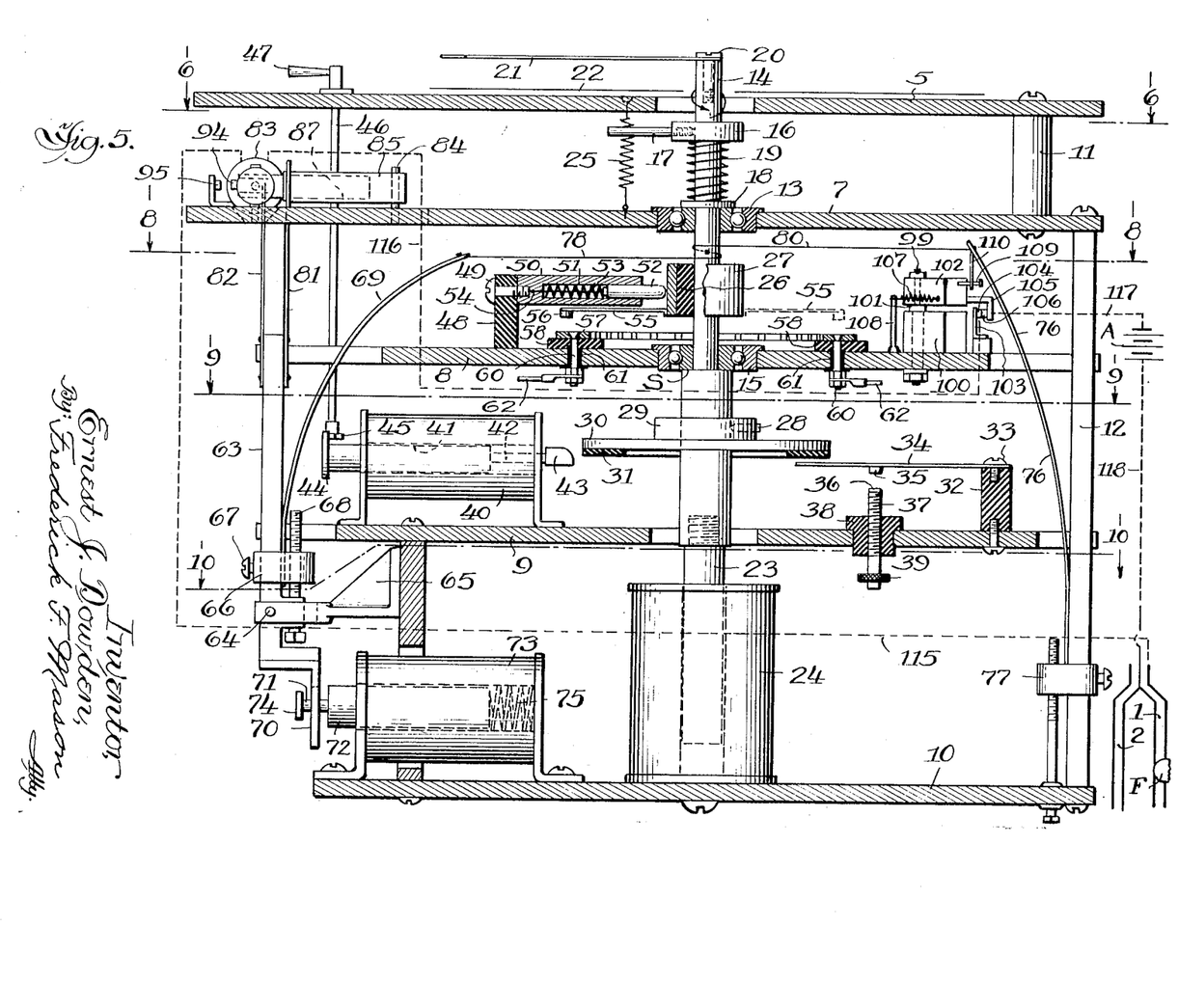
Fig. 5 is a vertical, transverse section of a speed registering apparatus embodying my invention, parts being omitted and parts being shown in elevation for convenience, this view showing the parts in position to start a registering operation upon contact of the first road switch by one of the front tires of a vehicle.

As shown in Fig. 5, the framework for supporting the indicator shaft and associated parts, comprises a top 5 which constitutes the top of the cabinet 6, see Fig. 3, and four vertically spaced apart horizontal platforms 7, 8, 9 and 10. Platform 7 is spaced downwardly from top plate 5 by any suitable number of posts 11, only one of which is shown, but preferably one at each corner. Platforms 8, 9 and 10 are secured in spaced relation by any suitable supports, such as posts 12, preferably one at each corner, but only one of which is shown. A rigid framework is thus provided. These platforms or supports, together with the supporting posts, are formed of nonmagnetic material, such as brass, Bakelite, or such other rigid but nonmagnetic material as may be desired.

General structure

Mounted centrally in platform 7, see Fig. 5, is a ball bearing unit 13, through the inner member of which the pointer shaft 14 is rotatable and axially slidable, and which pointer shaft is made of nonmagnetic metal, preferably brass. A similar ball bearing unit 15 is centrally mounted in platform 8 and in which the shaft 14 is likewise rotatably and axially movable. Shaft 14, immediately below ball bearing unit 15, is of a larger diameter thus forming a shoulder s which is normally pressed upwardly against the bottom face of the inner member of this ball bearing unit. Collar 16 is fixed by the threaded end of stop pin 17 onto shaft 14 at a point spaced upwardly from ball bearing unit 13. Loosely mounted on shaft 14 immediately above the inner member of ball bearing unit 13, is a washer 18 between which and collar 16 is a coiled compression spring 19 surrounding the shaft. This spring normally holds the shaft in elevated position with shoulder s in contact with the lower face of ball bearing unit 15. The shaft 14 thus is held in its uppermost position until it is pulled downwardly by means later to be described. Fixed to the upper end of shaft 14 by a screw or the like 20, is a pointer 21 positioned above a dial 22 upon which the miles per hour speeds of the vehicles passing between the two road switches are printed.

Secured to the lower end of pointer shaft 14 is a shaft extension 23 formed of steel and constituting in effect the movable core of the solenoid 24, this solenoid when electrically energized drawing the shaft extension 23 thereinto and moving the pointer shaft 14 downwardly for purposes later more fully described. When solenoid 24 is deenergized shaft 14 will, under the influence of push spring 19, move upwardly until shoulder s comes into contact with the lower face of ball bearing unit 15. Shaft 14 thus rotates easily inside the opening in solenoid 24, as well as in the ball bearing units 13 and 15. The pointer shaft 14 is made of brass or other nonmagnetic metal or material down to the lower extension 23, which as stated is made of steel. Pin 17 acts as the stop for the shaft, striking against the coil spring 25 when the pointer has been returned to zero or starting position. The purpose of having pin 17 strike coil spring 25 is important and will later be more fully explained. As seen in Fig. 5, the solenoid 24 is mounted upon the bottom platform 10.

Fixed to the pointer shaft 14 to rotate therewith, is a sleeve 26 which is formed of insulating material so that it will not conduct electricity. Surrounding sleeve 26, and fixed to rotate therewith and with the pointer shaft, is a cylindrical ring or sleeve 27 formed of metal or the like that will conduct electricity. It is thus seen that any electric current applied to ring 27 cannot be transmitted to pointer shaft 14 because of the insulating sleeve 26 interposed between the two.

Fixed to the shaft 14 by set screw 28 is a hub 29 of an integral disk 30, the hub and disk being formed of any desired metal or rigid material and rotatable with the shaft. On the bottom face of disk 30 is secured an annular member 31 of insulating material. Secured to platform 9 to extend upwardly therefrom, is a post 32 formed of Bakelite or other suitable insulating material, and having fixed on its upper end by a screw 33, or the like, an elongated spring arm 34 formed of spring copper or other suitable resilient material capable of conducting electricity therethrough and to screw 33. The free end of spring arm 34 extends to a position directly below insulating member 31 of disk 30. Fixed intermediately of the length of spring arm 34, to extend downwardly therefrom, is a contact point member 35, which, when disk 30 is moved downwardly with shaft 14, will contact the contact point member 36 on the upper end of metal screw 37 threadably mounted in the insulating block 38 which in turn is fixed in the platform 9. The lower end of screw 37 is formed with a knurled head 39 to enable suitable adjustment of the normal space between contact point members 35 and 36. Insulating block 38 thus insulates screw 37 from platform 9.

Mounted upon platform 9 at the left hand side of disk 30, as viewed in Fig. 5, is a solenoid 40 having a steel core 41 longitudinally movable therein and formed with an extension 42 having on its end a brass, or other nonmagnetic, head or shoe 43 which, when the shaft 14 and disk 30 are moved to their lowermost position by solenoid 24, and when solenoid 40 is energized, will move over the upper surface of disk 30 and act as a brake to hold the shaft 14 down and against further rotation until shoe 43 is manually withdrawn from over disk 30. To enable this manual withdrawal, the outer end of core 41 is formed with a disk or flange 44 behind which seats an arm 45 fixed to the lower end of rod 46 which is rotatably mounted in the supporting frame and has fixed to its upper end above top 5 a handle 47. When the solenoid 40 is deenergized its core 41 and shoe 43 may readily be moved to the left, as viewed in Fig. 5, by movement of handle 47, to withdraw the shoe from over disk 30. This serves as a reset for solenoid 40 when desired.

Fixed to platform 8 to upstand therefrom, is a post or block 48, see Fig. 5, formed of insulating material. Secured to the inside of the upper end of this post by a metal screw 49 is a brass cylinder 50 having a round opening or bore 51 open at its inner end and extending longitudinally a large part of its length. Slidably mounted in bore 51 is a brass or carbon brush 52 which is yieldably urged into constant contact with the metal sleeve 27 by the coil compression spring 53 mounted in bore 51 behind brush 52. It is thus seen that brush 52 will be held in contact with sleeve 27 during both rotational and axial movement of pointer shaft 14. Connected at one end to brush 52 and at the other end to screw 49 is a flexible wire 54 to conduct electricity therethrough as later more fully explained, but which circuit is insulated from platform 8 by the insulating post 48, and also insulated from shaft 14 by the insulating sleeve 26. Secured to the bottom portion of metal sleeve 27 to extend radially outwardly therefrom and be low enough to clear cylinder 50 during rotation of shaft 14, is an arm 55 having some resiliency and formed of material which readily conducts electricity, such as copper or the like. Fixed to the outer end of arm 55 and extending downwardly therefrom is a contact point 56.

Figures 6, 7, 8:
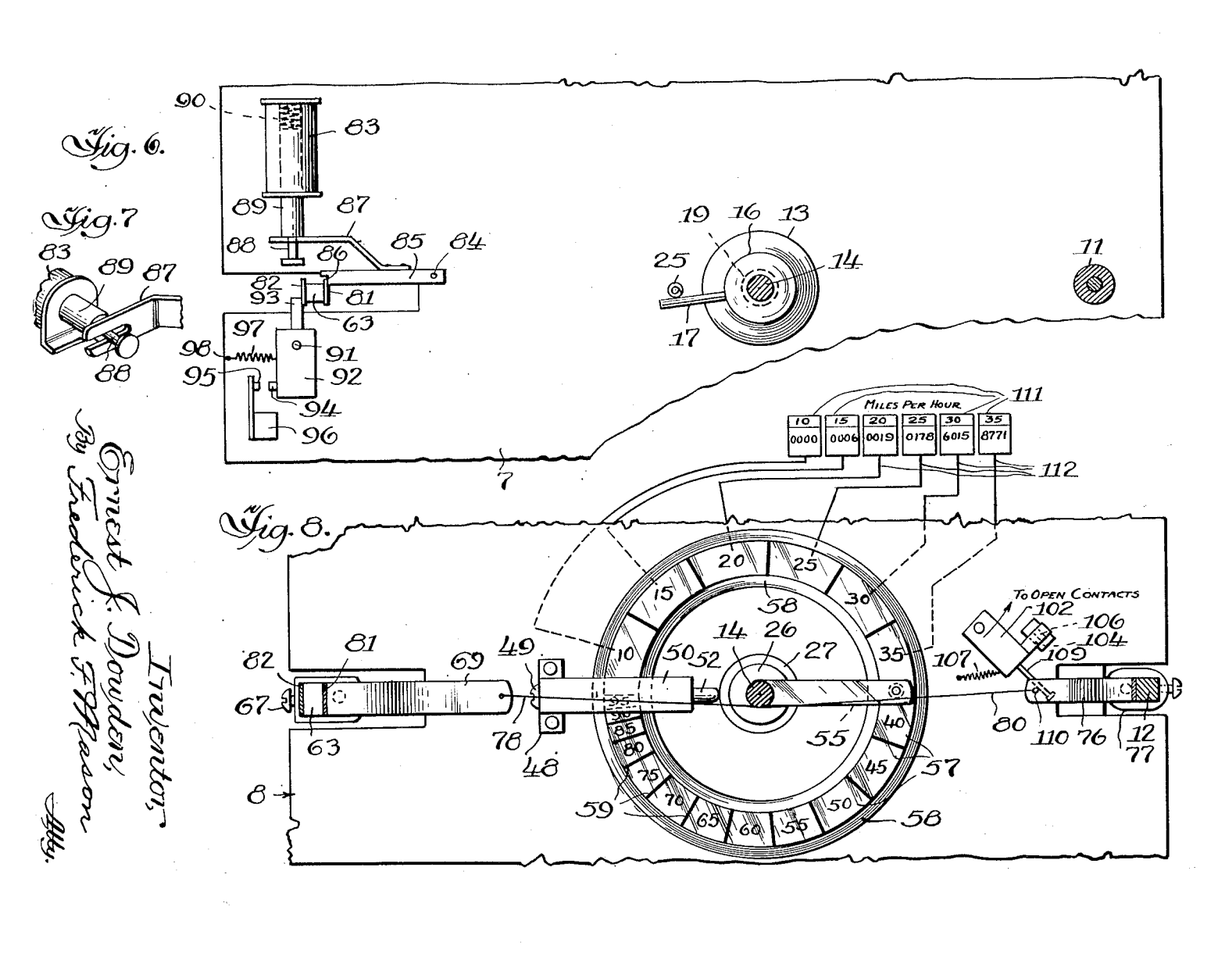
Fig. 6 is a fragmentary, horizontal section on the line 6—6 of Fig. 5.
Fig. 7 is a fragmentary, perspective view of a detail of one of the solenoids and associated parts.
Fig. 8 is a fragmentary, horizontal section on the line 8—8 of Fig. 5.
Figure 9:
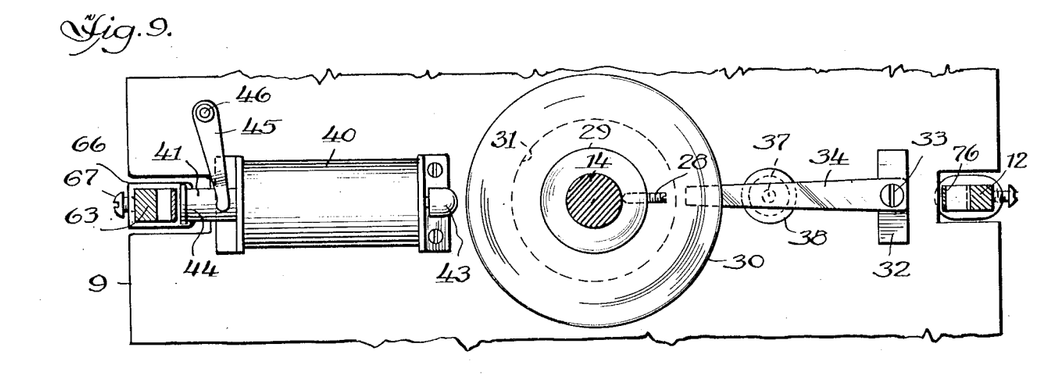
Fig. 9 is a fragmentary, horizontal section on the line 9—9 of Fig. 5.
Figure 10:
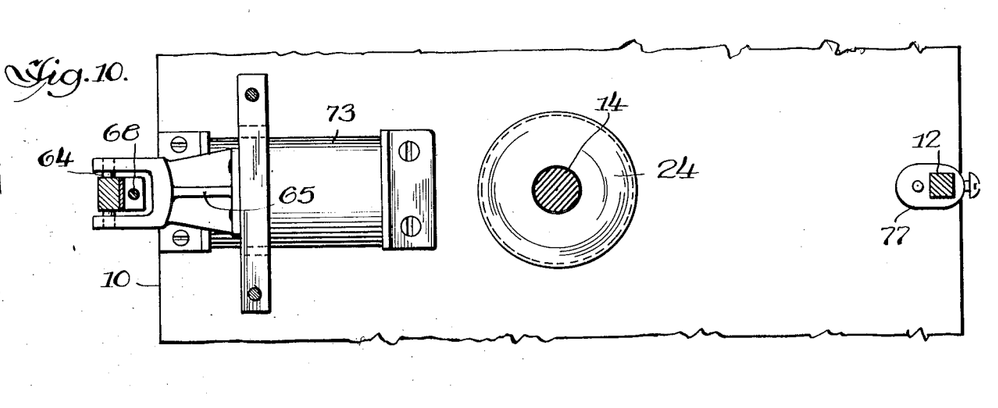
Fig. 10 is a fragmentary, horizontal section on the zig-zag line 10—10 of Fig. 5.

Secured to platform 8 is an annularly arranged series of metal segments 57 arranged concentrically with relation to shaft 14 and spaced therefrom. These segments are each insulated from platform 8 by insulating pads 58, and are insulated from each other by insulating strips 59, as seen in Fig. 8. Fixed to each of said segments is a conducting pin or wire 60 passing down through an insulating block 61 each seated in an opening in platform 8 to insulate each of pins 60 from the platform, as seen in Fig. 5. To the lower end of each of pins 60 is electrically attached a conducting wire 62 to form parts of circuits leading to electric counters as later more fully described. This annular series of segments 57 has any desired number of individual segments depending on how many different speeds in miles per hour it is desired to record. On the dial 22, on top of the cabinet 6, are printed the different speeds from zero up to 100 miles per hour, or more if desired, corresponding to the speeds of cars passing from the first to the second road switches. These different speeds are printed starting with zero and proceeding in a clockwise direction around the dial, while the pointer and pointer shaft rotate in a counterclockwise direction. For example, the pointer will move from zero, or start, to 100 miles per hour, in exactly the same length of time as the car crossing the road switches at 100 miles per hour will require to move from the first road switch to the second road switch. As the shaft 14 with pointer 21 travels around the dial in a counterclockwise direction, this rotation of shaft 14 is constant or uniform, hence, while the vehicle is moving from the first road switch to the second road switch, shaft 14 and the pointer 22 are travelling at a constant speed of rotation from zero. Shaft 14 has attached to it the arm 55 and contact point 56.

In carrying out the present invention I arrange the segments 57 so that a segment is placed directly below each of the speeds indicated on the dial. For example an electrical segment representing the 50 miles per hour to be recorded on the corresponding electrical counter, is placed directly below the 50 miles per hour mark on the dial and exactly the same number of degrees from the starting position of the contact point 56 of arm 55 as is the 50 M. P. H. mark printed on the dial from the starting position of the pointer 21. This means that when the pointer 21 is over the 50 M. P. H. mark on the dial, the contact point 56 will be over the 50 M. P. H. segment, and so on for all of the segments. In other words, this would apply to all segments being placed in a relative position to the speed markings on the dial. While I have shown and described the dial and segments as represent speed from zero to 100 M. P. H., it is to be understood that a higher number of speeds can be registered and recorded if desired, by making the appropriate changes in the device to take care of the same, without departing from the spirit of my invention.

The segments are each formed of a material that will readily conduct electric current, and that will upon contact with contact point 56 close an electric circuit instantly and without damage from an electric arc when that circuit is broken. By means of these different segments an electric current can be transmitted to the appropriate counter or tabulator representing the particular speed being recorded. A separate segment is employed for each counter used. As many segments and as many counters, as is desired, to tabulate that many different speeds may be used.

Referring to Fig. 5, it will be seen that on the left hand side of the supporting frame, a rigid swingable arm 63, preferably a metal strip or bar of substantial rigidity, is pivoted at 64 to a metal bracket 65 secured to the platform 9. Attached to the lower end portion of arm 63 is an adjusting clamp 66, which may be secured in adjusted positions on arm 63 by a set screw 67. When the screw 67 is loosened, clamp 66 may be adjusted up or down on arm 63 by rotating screw 68 in the desired direction, screw 68 being threaded through clamp 66 and swiveled in an appropriate lug on arm 63. Clamped at its lower end between the clamp 66 and the arm 63 is an elongated flat spring 69, which when arm 63 is swung up to vertical position has a predetermined amount of tension set up therein, and which tension is relieved when arm 63 is swung inwardly as later more fully explained. A short distance below fulcrum 64, arm 63 is formed with a downwardly extending portion 70 having an elongated slot of a width to slidably receive the neck 71 of the core 72 of solenoid 73 mounted on the bottom platform 10. Fixed to the outer end of neck 71 is a disk head 74 of a size to prevent the neck from being pulled longitudinally out of said slot, but enable arm 63 to be swung in a counterclockwise direction, as viewed in Fig. 5, when solenoid 73 is electrically energized to draw core 72 thereinto. Acting against the rear end of core 72 is a compression spring 75 which, when solenoid 73 is deenergized, will assist spring 69 in swinging arm 63 clockwise as viewed in Fig. 5, when the latching mechanism, later described, is released. The amount of tension in flat spring 69 may be increased or decreased as desired by rotating screw 68 to move clamp 66 upwardly or downwardly, set screw 67 being loosened during such adjustment and then tightened.

On the opposite side of the apparatus from spring 69 is another elongated flat spring 76 which at its lower end is mounted on post 12, see Fig. 5, by a clamp 77 similar to clamp 66 of spring 69, and adjustable in a similar manner for adjusting the tension in spring 76.

Attached at the upper end of flat spring 69 is a cord or flexible wire 78 which is wound one or more times around the pointer shaft 14 and secured thereto by a screw 79 or any other suitable means as desired, see Fig. 4. Also attached at the upper end of flat spring 76 is a similar cord or flexible wire 80 which is wound one or more times around the pointer shaft 14 and secured thereto by screw 79 or other fastening means as desired. As will be understood in Figs. 4 and 5, an outward pull on cord 80 will rotate shaft 14 in a counterclockwise direction as viewed from above, and an outward pull on cord 78 will rotate shaft 14 in a clockwise direction as viewed from above.

Figures 11, 12:
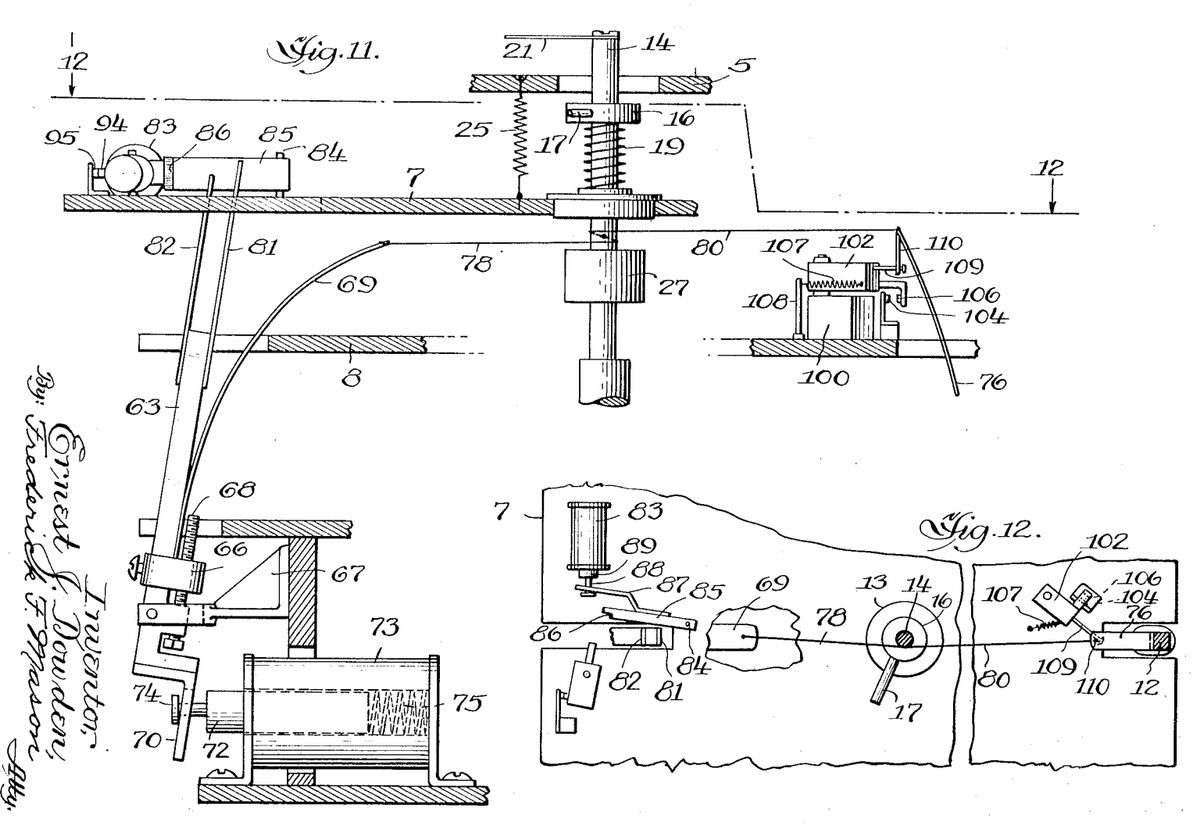
Fig. 11 is a vertical, transverse section of some of the parts of Fig. 5 and similar thereto, but showing the position these parts occupy when the first road switch has been closed by a vehicle front tire.
Fig. 12 is a fragmentary, horizontal section, partly broken away, on the zig-zag line 12—12 of Fig. 11.
Figure 13:
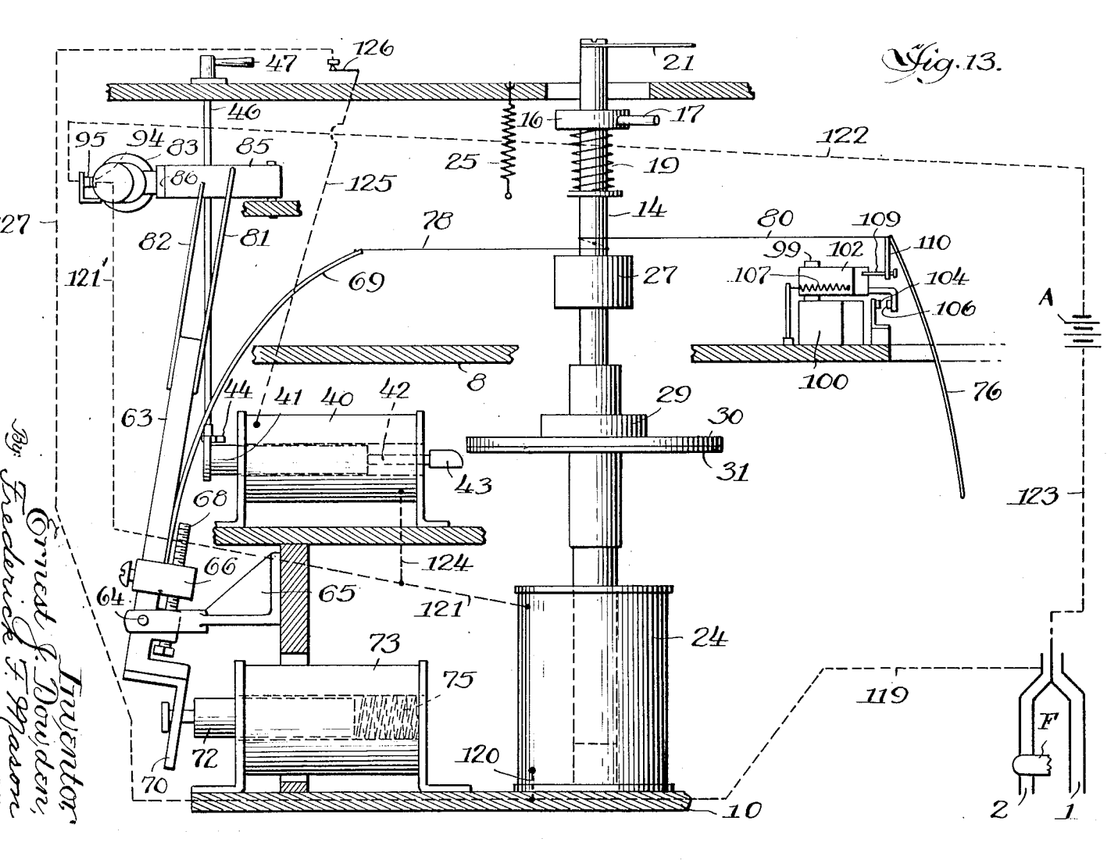
Fig. 13 is a vertical, transverse section of some of the parts of Fig. 5, but showing them after the first road switch has been closed and just at the instant that the second road switch has started closing, but before said parts have moved in response to said closing.
Figure 14:
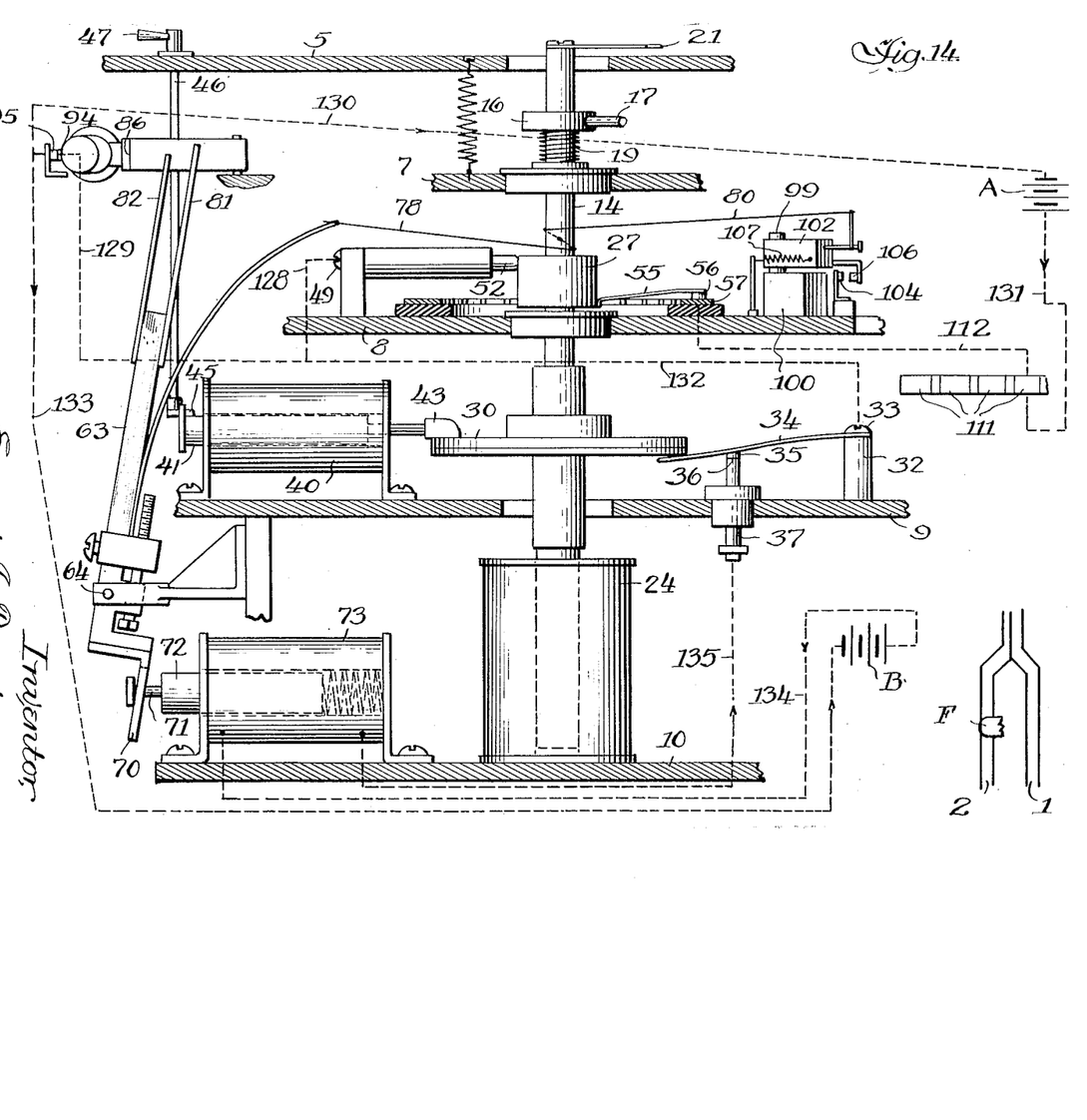
Fig. 14 is a view similar to Fig. 13, but omitting some parts and adding others, to more clearly illustrate further operations.
Figure 15:
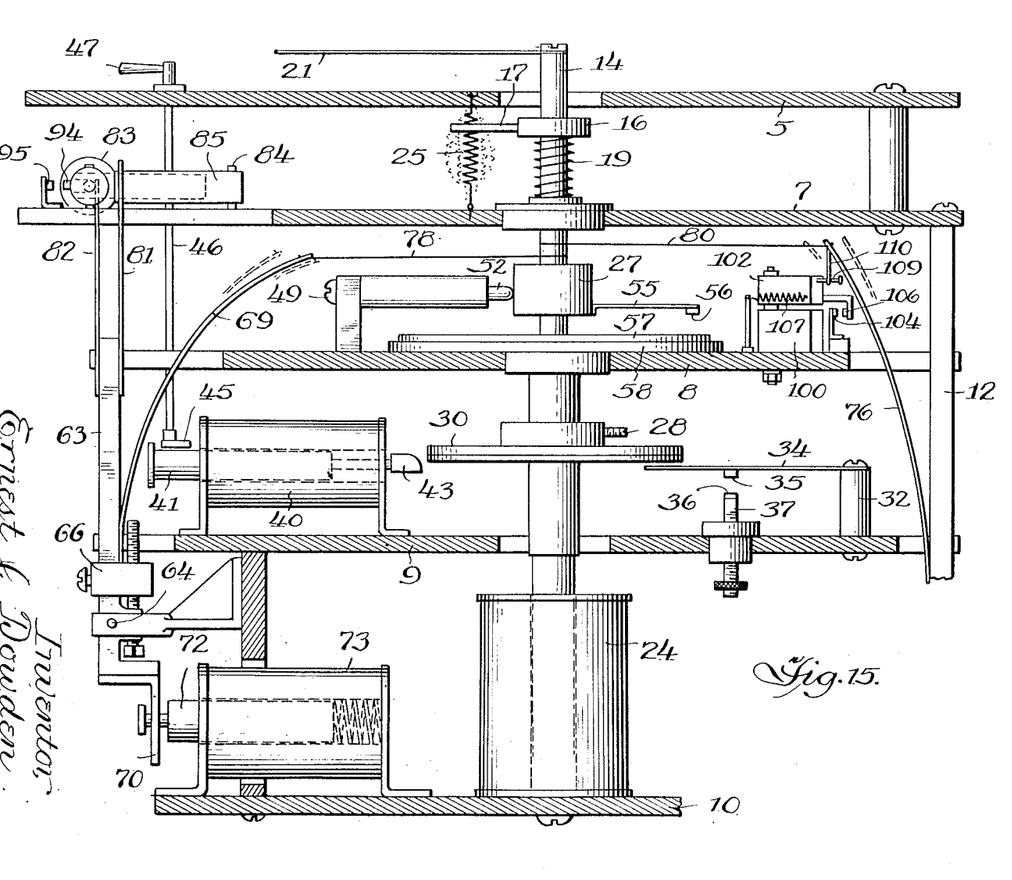
Fig. 15 is a view similar to Fig. 5, but omitting some parts and additionally illustrating further operations.
Figure 16:
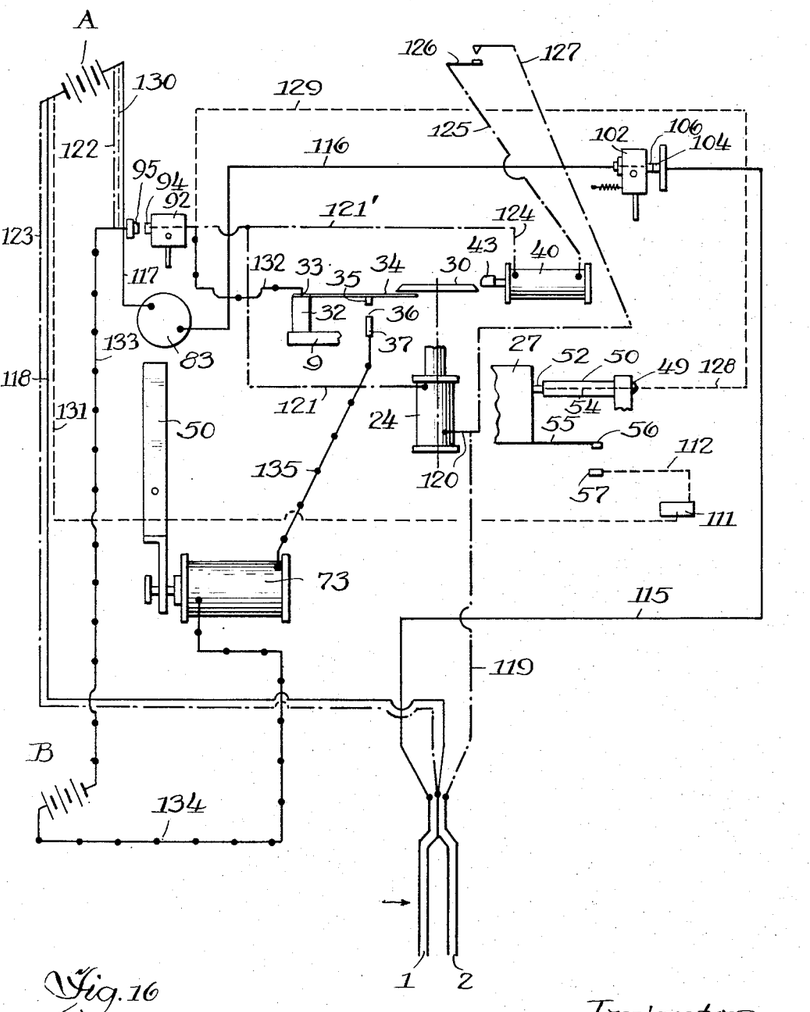

Outward pull on cord 80 by the tension in flat spring 76 will rotate shaft 14 and pointer 21 in a speed registering operation, and an outward pull on cord 78 by the tension in flat spring 69 will reset the pointer and return it to zero or starting position. When the arm 63 is in vertical position, as seen in Figs. 5 and 15, the tension in flat spring 69 is greater than that in flat spring 76 so as to reset the pointer, but when the arm 63 is swung inwardly as seen in Figs. 11, 13 and 14, the tension in spring 69 is relieved, and the tension in spring 76 is then available to rotate the shaft and pointer in speed registering operation.

*Latching means for arm 63*

Secured at its lower end to the upper end of the inner face of arm 63 is a flat spring member 81 extending upwardly therefrom to a distance above platform 7, as seen in Fig. 5. Also secured in a similar manner to the upper end of the outer face of arm 63 is a flat spring member 82 extending upwardly not quite as far as flat spring 81 and approximately parallel thereto.

As seen in Figs. 5–7, a solenoid 83 is mounted on platform 7. Fixed to platform 7, to upstand therefrom, is a fulcrum pin 84 upon which is swingably mounted an arm 85 formed of nonmagnetic material and having a portion of its free end cut away to form a notch 86 which seats behind and holds spring arm 81 when arm 63 is moved into vertical position. Fixed to arm 85 is an angularly bent arm 87 extending at its offset end somewhat beyond the end of arm 85, and having an opening or slot to slidably receive the reduced bottle neck end portion 88 of the steel core 89 of the solenoid 83. Behind the inner end of core 89 is a compression spring 90 to normally urge this core outwardly of the solenoid, when the solenoid is deenergized, to hold the upper end portion of spring member 81 in notch 86 with arm 63 vertical, until solenoid 83 is again energized. Energization of solenoid 83 will draw the steel core 89 inwardly until the enlarged disk end of bottle neck 88 will strike arm 87 with a hammer blow, and correspondingly move arm 85 to free spring arm 81 from notch 86 and permit arm 63 to swing inwardly for purposes later more fully described.

Upstanding from platform 7, adjacent the upper end of spring member 82, is a fulcrum pin 91, upon which is pivotally mounted a switch member 92 having fixed thereto at one end an extension arm 93 which is pushed a slight distance to move switch member 92 in a counterclockwise direction, as viewed in Fig. 6, by the upper end of spring member 82 as arm 63 is moving into the final portion of its movement into vertical position. Fixed adjacent the end of switch member 92, see Fig. 6, and extending from the left hand side thereof, is a contact point 94 which, at the proper time as later more fully explained, makes electrical contact with the stationary contact point 95 carried by an arm extending from the stationary post 96 fixed to and insulated from platform 7. A wire is connected to contact point 94, and another wire is connected to contact point 95, to conduct electric current to these points, these wires forming parts of electric circuits as later more fully explained, see Figs. 13, 14 and 16. Attached to switch member 92, upon the same side as contact point 94, and between this contact point and fulcrum pin 91, is a coil tension spring 97, which, at its other end, is fixed to a stationary pin 98 fixed to platform 7 or other part as desired. It is thus seen that when arm 63 is moved to vertical position contact points 94 and 95 are separated by extension 93, and when arm 63 swings inwardly to free the end of spring member 82 from extension 93 the tension spring 97 will cause switch member 92 to rotate in a clockwise direction as viewed in Fig. 6, and close contact points 94 and 95 together.

*Switch operated by flat springs 76*

Secured to platform 8 to upstand therefrom is a post 99, the somewhat larger diameter lower part of which stationarily fixes the block 100 to platform 8. Spaced upwardly a slight distance from block 100 by collar 101, is a switch member 102, formed of insulating material, which is swingably mounted on the upper portion of post 99. Fixed to platform 8, and extending upwardly and insulated therefrom, is a stationary bracket 103 having a stationary contact point 104. Extending outwardly and downwardly from one side of switch member 102 is an arm 105, see Fig. 5, having on the inside of the downwardly extending portion a contact point 106 which when the switch member 102 is swung in a clockwise direction, looking down thereon as viewed in Fig. 5, will come in contact with contact point 104, and when swung in the opposite direction will move away from contact point 104. A wire is connected to contact point 104, and another wire is connected to contact point 106, to conduct electric current to these points, these wires forming parts of electric circuits as later more fully explained, see Figs. 5 and 16.

As seen in Fig. 5 the fulcrum post 99 is positioned adjacent the rear end of switch member 102, while adjacent the front end of this switch member on the side face opposite from the face carrying the contact point 106 is attached a coil tension spring 107 leading laterally therefrom and at its other end fixed to an upstanding pin 108 mounted on platform 8. Spring 107 normally urges the switch member 102 to swing in a direction to close contact points 104 and 106 together, except when they are separated by other forces later more fully explained. Extending forwardly from the front end of switch member 102 is a sturdy pin 109. Fixed at or adjacent the upper end of flat spring 76 is a pin or projection 110 which extends vertically across the inside of pin 109 and just touching it when the indicating pointer 21 stands at zero on the dial, the contact points 104 and 106 being closed together at this time.

When the indicator shaft 14 is rotated in a counterclockwise direction, when viewed from above, by the pull of the flat spring 76, the projection 110 attached to spring 76 will push outwardly against pin 109 and rotate switch member 102 and separate contact points 104 and 106 and keep them separated until shaft 14 is rotated back in a clockwise direction to a position to bring the pointer to zero position on the dial which will again close contact points 104 and 106. When the pointer is at zero position the flat spring 76 is bent inwardly. The pressure from the flat spring 76 is the means of rotating the shaft 14 in a counterclockwise direction and thereby making the speed registration on the dial. This is the opposite from that of my said Patent 2,657,749. From the above it will be seen that upon the slightest rotation of shaft 14 in a counterclockwise direction, viewed from above, from starting position, the contact points 104 and 106 will be separated.

*Speed tabulators or counters*

Each speed registration taken on this apparatus is tabulated or counted on the corresponding one of the counters designated generally at 111, there being one counter for each segment 57, thus providing one counter and one segment for each speed numbered on the dial. These counters are all alike, hence only one of them need be described. As seen in Fig. 8, each counter 111 is electrically connected by a wire 112 to the particular segment 57 representing the speed indicated by the pointer on the dial, and to be counted by the counter for that speed. While only a limited number of counters have been shown on the drawings for illustrative purposes, it is to be understood that as many counters and corresponding segments may be used as desired. These counters are conventional electric counters that may be purchased on the market. They will be arranged in a group at the top of the cabinet 6, and be marked for the particular speed for which they are connected up. They each operate additively by adding 1 to the previous reading thereon. This enables the keeping of a record of how many cars, and at what speeds, have passed over the road switches for any designated length of time, for example one day. If such record shows too many at high speeds, particular testing of the individual cars may be made as desired.

In order for a clearer understanding of the structure and operation of the switch member 102 and associated parts, this switch member and its supporting block 100, have been shown in the drawings as being positioned a greater distance counterclockwise, when viewed from above, than they would be actually positioned in the apparatus. They will preferably be positioned with their length at approximately right angles to the cord 80.

Operation

In Fig. 5 the apparatus is shown with the parts in the position they occupy at the instant of closing the first road switch 1, but before movement of the parts that would result from closing the first road switch, with the pointer at zero or starting position, the arm 63 in vertical position, the contact points 94—95 separated, and the contact points 104 and 106 closed. The spring pressure of flat spring 69, when arm 63 is vertical, is greater than the spring pressure being exerted by the flat spring 76. At this time there is no brake holding the shaft 14 from rotating, but this shaft is free to rotate as soon as the spring pressure is relieved from flat spring 69, which pressure at this instant is holding shaft 14 against rotation. The shaft 14 is subject to whichever flat spring, 69 or 76, exerts the greater pressure to rotate it either clockwise or counterclockwise. The pressure from flat spring 69 being the greater, the shaft 14 has been rotated clockwise, as viewed from above, until the stop pin 17 came to rest against the coil spring 25. It should here be kept in mind that the flat spring 76 is the one that is going to exert the pressure to rotate shaft 14 counterclockwise during the period of speed registration, because when the pressure from spring 69 is relieved from shaft 14 there will only be left on this shaft the pressure from spring 76.

As the tire F of one of the front wheels of the car closes the first road switch 1, see Fig. 5, there is closed an electric circuit passing from first road switch 1 through wire 115, solenoid 83, wire 116, contact points 104 and 106, wire 117, battery A, and wire 118 back to the first road switch. This energizes solenoid 83, draws the core 89 thereinto and moves the notch 86 of arm 85 away from spring arm 81 and releases arm 63 to swing inwardly on pivot 64, under the pull of flat spring 69 and the push of spring 75 of solenoid 73, which latter at this time is deenergized. The position of the parts following this operation, which resulted from the closing of the first road switch, is shown in Fig. 11 in which it will be seen that, due to the moving inwardly of the arm 63, the spring pressure on flat spring 69 has been relieved, the contact points 94—95 have been closed, and contact points 104 and 106 have been separated. Relieving of the pressure on flat spring 69 transfers all of the shaft rotating power to flat spring 76 and cord 80, the cord 78 having now become slack and the core 72 of solenoid 73 extended outward by spring 75. The closing of contact points 94—95 was effected by the spring arm 82 moving inwardly with arm 63, away from extension 93 of switch member 92, thus leaving pull spring 97 free to swing this switch member and move contact point 94 against contact point 95. This means that whenever arm 63 is swung inwardly, contact points 94—95 will be closed together.

The pressure from flat spring 69 now having been relieved, the indicator shaft 14 will be rotated counterclockwise, as viewed from above, by the pull from flat spring 76 through the cord 80. This rotation will be constant and will continue until the friction or braking action caused by engagement of contact point 56 with the segment directly therebelow stops it as a result of the energization of solenoid 24, when a tire of one of the front wheels of the car closes the second road switch 2.

In Fig. 13 is shown the tire F of one of the car front wheels closing the second road switch 2. It should be noted that the first road switch is dead because the contact points 104 and 106 were separated at the time when the front wheel closed the first road switch. This separation of contact points 104 and 106 was accomplished when the projection 110 of the flat spring 76 pushed against pin 109 and caused the switch member 102 to rotate on its axis 99 in a counterclockwise direction when viewed from above, against the pull of pull spring 107. The first road switch will remain dead until contact points 104 and 106 are again closed together. It will thus be seen that no action can come from the car rear wheels crossing the first road switch prior to the closing of the second road switch.

Still referring to Fig. 13, in which as stated above, the front tire of the car is just closing the second road switch, there is being closed an electric circuit passing from the second road switch 2 through wire 119, wire 120, solenoid 24, wire 121, wire 121', contact points 94—95, wire 122, battery A, wire 123, and back to the second road switch. This energizes solenoid 24 and pulls shaft 14 downwardly to close contact point 56, see Fig. 5, against the segment directly therebelow, to stop the rotation of shaft 14, and to actuate the counter for the speed then being registered, and to close contact points 35—36 for returning arm 63 to vertical position.

In order to be able to hold the shaft 14 down, if desired, in its depressed position so as to retain the pointer over the registered speed on the dial, I have provided solenoid 40, earlier described herein, having the head 43 to move over disk 30 when the shaft is depressed and solenoid 40 is energized. To enable this solenoid 40 to be energized at the proper time, it is included in a circuit passing through wire 124, having live connection with wires 121 and 121', see Fig. 13, then through solenoid 40, wire 125, hand switch 126, wire 127, wire 119, and back to the second road switch 2. In Fig. 13, hand switch 126 is shown closed, which means that at the proper time solenoid 40 will be energized. It is a matter of choice whether the hand switch 126 is closed to hold the reading on the apparatus, or is left open to omit this operation. It is important to keep in mind however, that upon each speed registering operation, the speed will be recorded on the appropriate counter, regardless of whether the solenoid 40 is used or not.

The results of energizing the solenoids 24 and 40 are shown in Fig. 14, in which it will be seen that solenoid 24 has drawn shaft 14 down against the pressure of push coil spring 19, and brought contact point 56 into contact with the segment 57 for that particular speed, and solenoid 40 has drawn the core 41 inwardly to place the brake head 43 directly over disk 30 to hold shaft 14 from any rotation because of compression spring 19 pushing disk 30 upward against brake head 43. The energizing of the windings of solenoids 24 and 40 were simultaneous, both being energized by the closing of the second road switch. Of course, if hand switch 126 is open, solenoid 40 will not be energized and brake head 43 will not be applied to disk 30, this being a choice of the operator.

This downward movement of shaft 14, having brought contact point 56 into contact with one of the segments 57, and having closed contact points 35—36, closes two other electric circuits. One of these circuits is shown in the upper half of Fig. 14, and passes electric current from contact point 56 through arm 55, sleeve 27, brush 52, wire 54, screw 49, wire 128, wire 129, contact points 94—95, wire 130, battery A, wire 131, one of the counters 111, wire 112, one of the segments 57, and back to contact point 56. The closing of this circuit will cause the appropriate counter 111 to count one. This counter is, of course, connected by its wire to the particular segment 57 for the speed of the car that has just crossed the two road switches. The other of the two circuits referred to above in this paragraph is shown in the lower half of Fig. 14, and passes electric current through closed contact points 35—36, arm 34, screw 33, wire 132, wire 129, contact points 94—95, wire 133, battery B, wire 134, solenoid 73, wire 135, screw post 37, and back to contact points 35—36. The closing of this circuit will energize the reset solenoid 73 which will pull its core 72 inwardly and swing arm 63 to vertical position and cause spring plate 81 to again seat in notch 86, and cause spring plate 82 to separate contact points 94—95. As will also be understood, the energization of the reset solenoid 73 and the operation of the counter 111 were simultaneous.

At this point the question might arise that if the shaft 14 were held down by the brake head 43, which would hold the contact points 35—36 together, would there be a current of electricity continuing to flow through the counter. This possibility is eliminated by the reset of the arm 63 to vertical being automatically effected simultaneously with the current going to the counter, this return of arm 63 to vertical also separating contact points 94—95 which will cut the circuit to the counter.

From the above it is seen that, after the front wheel of the car has crossed the first road switch, and when it has crossed the second road switch, the speed has been registered on the dial by the pointer, and has been tabulated by the appropriate counter. Also, that if the hand switch 126 were closed, the pointer 21 remains on the indicated speed on the dial until such time as the operator releases the brake head 43 from disk 30 by turning the release handle 47. Also that the speed of each registration is recorded on the counter regardless of whether hand switch 126 is open or closed, and that the first road switch was dead from the time the front wheel crossed it and until such time as the pointer comes to a complete and full stop at zero.

It is also seen that the moment arm 63 is swung inwardly, contact points 94—95 are closed, and the moment flat spring 76 starts to rotate shaft 14 on a registering operation contact points 104 and 106 are separated. It should also be noted that the arm 63 does not swing inwardly until the front wheel crosses the first road switch and is not returned to vertical position until the front wheel crosses the second road switch. Return of arm 63 to vertical position separates contact points 94—95 and renders the second road switch dead which will remain dead until a front wheel crosses the first road switch to release arm 63 to swing inwardly and close contact points 94—95. Also that the circuit to the segments and to the counters cannot be closed until the arm 63 is tipped or swung inwardly permitting the contact points 94—95 to come together. It is also noted that no electric current can flow to the solenoids 24 and 40 until the arm 63 has been swung inwardly and the contact points 94—95 closed. The solenoid 83 can be energized only by closing the first road switch and not by closing the second road switch. It follows therefore, that the second road switch remains dead until after the first road switch has been closed by the vehicle.

An important feature of this invention is shown in Fig. 15, in which it will be seen that when the stop pin 17, which is carried by collar 16, has been rotated in a clockwise direction during the reset operation when the pointer 21 is returning from its registered position back to starting position, it will strike the coil spring stop member 25 which will yield to a certain extent so that vibrations are set up therein causing rebounds of pin 17. These rebounds tend to delay the time when pin 17 comes to stationary rest against spring 25. These vibrations and rebounds create a delay of time when contact points 104 and 106 stationarily come to rest against each other. As will be understood, the lower the speed of the passing vehicle, the farther around the dial the pointer will travel, and the greater will be the force with which pin 17 strikes the coil spring 25, thus resulting in greater and more vibrations which will cause a greater delay in the contact points 104 and 106 coming to stationary rest together. The greater the vibrations of spring 25, the longer the contact points 104 and 106 will be kept apart. These vibrations of spring 25 and of these contact points will be understood from the dotted lines in Fig. 15. The importance of this is that it automatically reduces the possibility of a vehicle of long wheel base having its rear wheels again actuate the apparatus when crossing the first road switch after the second road switch has been closed by the front wheels.

Figure 17:
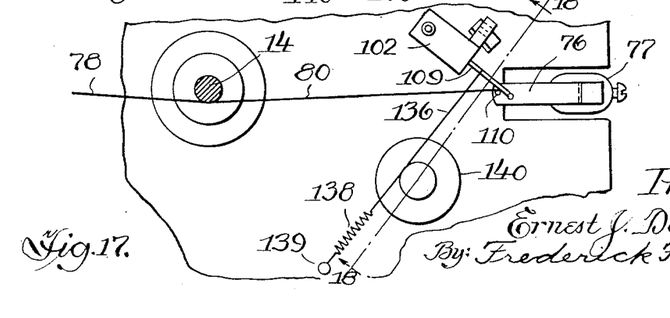
Fig. 17 is a fragmentary plan view of a preferred form of delaying means for preventing the operation of the first road switch by the hind wheels of a vehicle having a long wheelbase, after the second road switch has been closed.

However, a preferred form of means for causing such delay in the closing of contact points 104 and 106 is shown in Figs. 17 and 18. In this form a cord 136 is substituted for the spring 107 of switch member 102, this cord being attached at one end to pin 109 at the forward end of switch member 102, and wrapped around the upstanding hub of member 137, and beyond said hub this cord has interposed in its length a coil tension spring 138, and beyond the spring the cord continues to an upstanding stationary post 139 to which it is fixed. Member 137 is rotatably mounted on the upstanding cylindrical neck of ratchet disk 140, with an anti-friction ball 141 interposed therebetween, so as to hold the lower face of member 137 vertically spaced from the upper face of the ratchet portion of disk 140. Pivotally mounted in an enlarged opening in member 137 is a dog 142 extending downwardly below the lower face of member 137. Formed in the upper face of the flat portion of disk 140 is an annular series of ratchet teeth 143 so arranged that the dog 142 will slide idly over them as the member 137 rotates in a clockwise direction, as viewed from the top of Fig. 18, when the switch member 102 is moved in a direction to separate contact points 104 and 106, and stretch coil spring 138. Ratchet disk 140 is in turn freely rotatable on an upstanding pin or post 144 which is fixed in platform 8. When the flat spring 76 is moved inwardly, its projection 110 moves inwardly and permits switch member 102 to swing in a clockwise direction, as viewed from the top, under the pull of coil spring 138 in cord 136. During this action, the cord 136, due to its being wrapped around the hub of member 137, will rotate said hub in a counterclockwise direction, as viewed from the top, and the dog 142 will engage the ratchet teeth 143 and cause the ratchet disk 140 to rotate with member 137 under the pull of spring 138. Under this rotation the ratchet disk 140 acts as a weight wheel whose inertia must be picked up during this rotation, which, as will be clearly understood, delays the closing of contact points 104 and 106. As will be understood the member 137 will rotate freely in a direction to permit the separation of contact points 104 and 106, but will be delayed in its rotation in the opposite direction which will correspondingly delay the closing of these contact points, and thus permit the hind wheels of a vehicle having a long wheel base to pass over the first road switch before contact points 104 and 106 are closed together, and without energizing the circuit of said first road switch. In other words this delay prevents the contact points 104 and 106 from closing until after said rear wheels have passed over the first road switch 1. This arrangement eliminates the need of the coil bumper spring 25 for which a rigid stop post may be substituted if desired.

Figure 19:
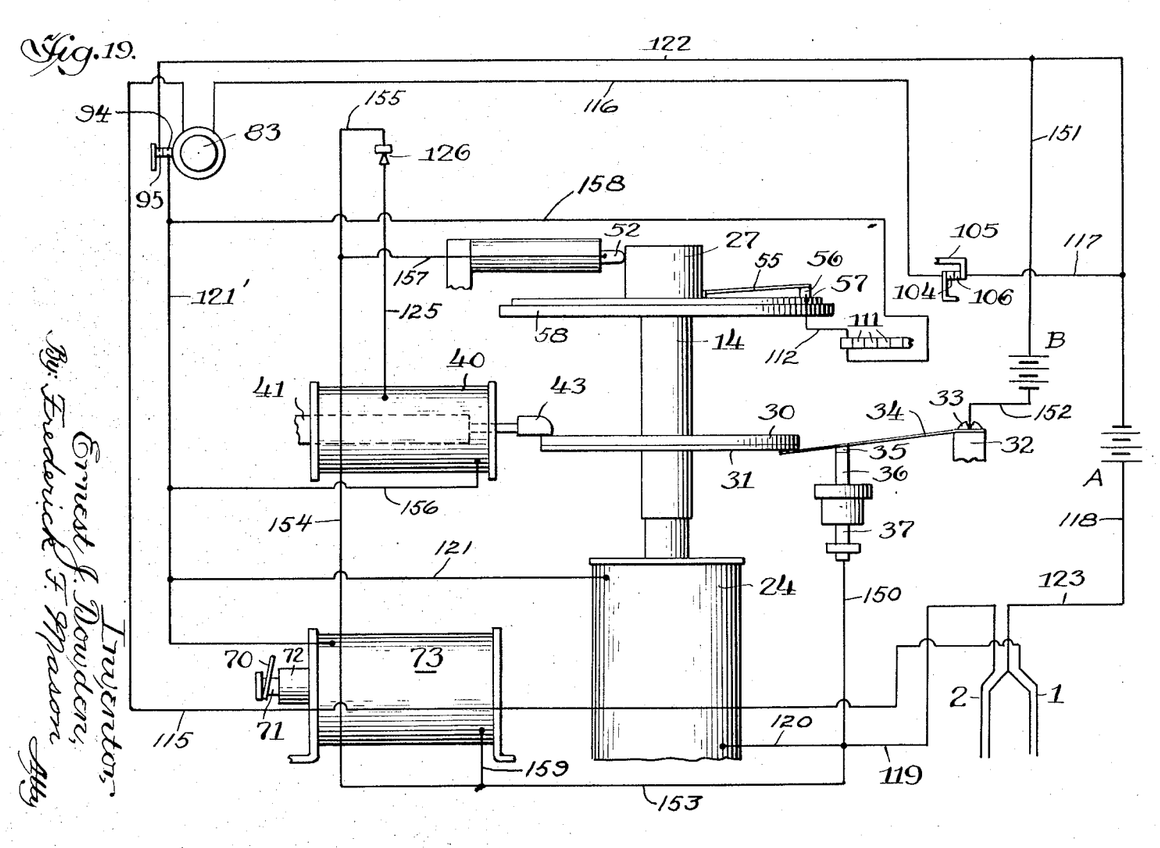
Fig. 19 is a circuit diagram of an improved arrangement of circuits.

In Fig. 19 is shown an improved arrangement of circuits, involving no change in the structure of the apparatus, but merely a change in the wiring connections to the various parts, so as to increase the precision of operation of the apparatus. In the wiring diagram shown in Fig. 16, when the tire has left the second road switch 2 the electric current is cut off from the solenoid 24, and push spring 19 will then raise the shaft 14 upwardly. This means that, with the wiring connections shown in Fig. 16, the solenoid 73 must perform the resetting operation within this short period of time. With the wiring connections shown in the circuit diagram of Fig. 19, there is no chance for the mechanical lag of movement of arm 63, from inward to vertical position, to cause any lack of cooperation with the other operations of the apparatus.

With the wiring connections of Fig. 19, the solenoid 24 will be energized and shaft 14 held down continuously from the time the front tire crosses the second road switch until the reset action is complete thereby separating the contact points 94—95. It also means that the windings in the particular counter 111 will be energized the same length of time, as will also the solenoid 40 (when the hand switch 126 is closed), and the solenoid 73. All are energized by the closing of contact points 35—36, and are deenergized by the separation of contact points 94—95.

The operation of the various circuits in the circuit diagram of Fig. 19, to bring about the above results, will be readily understood by an inspection of Fig. 19. The operation of the solenoid 83 to unlatch arm 63 for inward swinging movement, is effected by the same circuit previously referred to herein, in which, upon the closing of the first road switch, electric current will flow from the first road switch through wire 115, solenoid 83, wire 116, contact points 104 and 106, wire 117, battery A, and wire 118 back to the first road switch.

The circuit operated when the front tire closes the second road switch, to energize solenoid 24, is the same as the one earlier described in connection with Fig. 13, and comprises current flowing from the second road switch 2, through wire 119, wire 120, solenoid 24, wire 121, wire 121', contact points 94—95, wire 122, battery A, wire 118, wire 123, and back to the second road switch.

The circuit to continuously keep the solenoid 24 energized from the time the second road switch is closed until the contact points 94—95 are separated, comprises current flowing through closed contact points 35—36, screw post 37, wire 150, wire 120, solenoid 24, wire 121, wire 121', contact points 94—95, wire 122, wire 151, battery B, wire 152, screw 33, arm 34, and back to contact points 35—36, as seen in Fig. 19.

The circuit in Fig. 19 for energizing solenoid 40, only when hand switch 126 is closed, comprises current flowing through closed contact points 35—36, screw post 37, wire 150, wire 153, wire 154, wire 155, hand switch 126, wire 125, solenoid 40, wire 156, wire 121', contact points 94—95, wire 122, wire 151, battery B, wire 152, screw 33, arm 34, and back to contact points 35—36.

The circuit in Fig. 19, for energizing the electric counters, comprises current flowing through closed contact points 35—36, screw post 37, wire 150, wire 153, wire 154, wire 157, brush 52, sleeve 27, arm 55, contact point 56, the particular segment 57 directly below contact point 56, wire 112, counter 111, wire 158, wire 121', contact points 94—95, wire 122, wire 151, battery B, wire 152, screw 33, arm 34, and back to contact points 35—36.

The circuit in Fig. 19, for energizing the solenoid 73 for swinging arm 63 to vertical position, comprises current flowing through closed contact points 35—36, screw post 37, wire 150, wire 153, wire 159, solenoid 73, wire 121, contact points 94—95, wire 122, wire 151, battery B, wire 152, screw 33, arm 34, and back to contact points 35—36.

From the above it will be seen that by using the circuits of Fig. 19, the solenoid 24 will be continuously energized, and shaft 14 held down, from the time the second road switch is closed until the contact points 94—95 are separated by the arm 63 returning to vertical position.

Having described my invention, I claim:

1. In speed registering apparatus for registering the speed of a passing object, in combination, a rotatable and axially movable shaft, means for rotating said shaft, a laterally extending arm fixed to said shaft, a contact point on said arm, a series of stationary segments spaced a slight distance below said contact point, a series of tabulators each electrically connected to one of said segments, means for moving said shaft axially at the end of a speed registering movement of the shaft and moving the contact point into engagement with one of said segments for operating the corresponding tabulator to record the speed of a passing object, a source of electricity, said contact point being electrically insulated from said shaft, and an electrical circuit including said source of electricity, said contact point, one of said segments, and one of said tabulators.

2. In speed registering apparatus for registering the speed of a passing vehicle, in combination, a frame, a first initiating device, a second initiating device spaced a predetermined distance from the first one along the path of the vehicle movement, a rotatable and axially movable shaft mounted in the frame, a spring connected to the shaft for rotating it in a speed registering direction by a front wheel of a passing vehicle passing said first initiating device, a second spring for rotating the shaft in the opposite direction by the front wheel of the vehicle passing said second initiating device, electrical means for moving the shaft axially by the front wheel of the vehicle passing said second initiating device, electrical means for tabulating the speed of the vehicle when the shaft is thus moved axially, and electrical means for increasing the tension in said second spring by the front wheel of the vehicle passing said second initiating device.

3. Speed registering apparatus as claimed in claim 2, in which the means for increasing the tension of said second spring includes a pivoted arm to which the second spring is adjustably mounted and a latch for the arm and a solenoid for operating the latch whereby the tension in the second spring will be automatically relieved by a front wheel passing the first initiating device, and automatically increased by said front wheel passing the second initiating device.

4. Speed registering apparatus as claimed in claim 3, including a stationary contact point and a movable contact point on said frame, a projection fixed to said shaft, and an electrical circuit connecting said contact points with said solenoid, said contact points being closed by said projection when the shaft has been moved axially so as to energize the solenoid and increase the tension in the second spring by the front wheel of the vehicle passing the second initiating device.

5. In speed registering apparatus for registering the speed of a passing vehicle, in combination, a frame, a first initiating device, a second initiating device spaced a predetermined distance from the first one, a rotatable and downwardly movable shaft mounted in the frame, a first spring connected to the shaft for rotating it in a speed registering direction, a second spring for rotating the shaft in the opposite direction, an arm pivotally mounted on the frame, said second spring being mounted on said arm which arm is movable inwardly and outwardly of the shaft, a first solenoid for releasably holding said arm in outward position, a first pair of separable contact points associated with said first solenoid and operated by said arm, a second pair of separable contact points operable by said first spring, a second solenoid connected to the arm for moving the arm outwardly of the shaft, a third pair of separable contact points adjacent the shaft that are closed when the shaft is moved downwardly, a third solenoid for moving the shaft downwardly, and electrical circuits correspondingly connecting said solenoids and contact points, the front wheel of a vehicle passing the first initiating device and energizing the first solenoid to release the arm to swing inwardly and close the first pair of contact points, and the second pair of contact points which were previously closed will be separated by the movement of the first spring, and the front wheel of the vehicle passing the second initiating device will energize the third solenoid and depress the shaft and close the third pair of contact points, and the second solenoid will be energized to return the arm to its outward position.

6. Speed registering apparatus as claimed in claim 5, said third pair of contact points including a tabulator contact point fixed to move with the shaft and a segment fixed to the frame, a tabulator, and electrical connections to the tabulator contact point, segment and tabulator, to tabulate the speed of a passing vehicle when the shaft is depressed.

7. In speed registering apparatus for registering the speed of a passing vehicle, in combination, a frame, a first initiating device, a second initiating device spaced along the path of the moving vehicle a predetermined distance from the first initiating device, a rotatable and axially movable shaft mounted in the frame, a first spring having a cord wrapped around the shaft for rotating it in a speed registering direction, a second spring having a cord wrapped around the shaft for rotating it in the opposite direction from that of the first spring, a swingable arm pivotally mounted on the frame, said second spring being adjustably mounted on said arm so that when the arm is swung outwardly of the shaft the tension in the second spring will be increased and when the arm is swung inwardly of the shaft the tension in the second spring is relieved to permit the first spring to rotate the shaft, means for swinging the arm outwardly when the speed registering rotation of the shaft has been accomplished, means for depressing the shaft while the arm is swinging outwardly, and means for tabulating the speed of a vehicle that has passed from the first initiating device to the second initiating device when the shaft is depressed.

8. Speed registering apparatus as claimed in claim 7, including a latch for holding the arm in outward position, and a solenoid for releasing said latch by the front wheel of a passing vehicle passing the first initiating device to relieve the tension in said second spring whereby said first spring will start the registering rotation of the shaft.

9. In speed registering apparatus for registering the speed of a passing vehicle, in combination, a first initiating device, a second initiating device spaced along the path of the vehicle a predetermined distance from the first initiating device, a rotatable and axially movable shaft, a first spring connected to the shaft for rotating it in a speed registering direction, a second spring connected to the shaft for rotating it in the opposite direction from that of the first spring, means for increasing and relieving the tension in the second spring, a pair of contact points comprising a stationary point and a complemental movable point normally resiliently urged into contact with the stationary point, said pair of contact points being separated by the first spring when rotating the shaft in speed registering direction and closed by the first spring returning to its original normal position with the shaft in zero speed position, the movement of the first spring to rotate the shaft in speed registering direction commencing by a front wheel of a vehicle passing the first initiating device and stopping by said front wheel passing the second initiating device, means for delaying the closing of the contact points, to prevent starting a new speed registering operation by a rear wheel of a long wheel base vehicle passing the first initiating device after a front wheel of said vehicle has passed the second initiating device, and means for registering the speed of the passing vehicle when the shaft is moved axially.

10. Speed registering apparatus as claimed in claim 9, in which the means for delaying the closing of the contact points comprises a rotatable member, a weight wheel, and a spring urged cord wrapped around said rotatable member and exerting its pull on the movable contact point, and a slip device between said rotatable member and the weight wheel that will enable the movable contact point to freely open when the first spring is rotating the shaft in a speed registering direction but will pick up the weight wheel when the movable contact point is moving toward the stationary contact point and delay closing of these points because of the inertia of the weight wheel.

11. In speed registering apparatus for registering the speed of a passing vehicle, in combination, a first road switch, a second road switch spaced a predetermined distance along the path of the vehicle from the first road switch, a rotatable and axially movable shaft, a first spring connected to the shaft for rotating it in a speed registering direction, a second spring connected to the shaft for rotating it in the opposite direction and returning it to zero speed position, means for relieving the tension in the second spring and causing the first spring to start rotation of the shaft in speed registering direction by a front wheel of a vehicle contacting the first road switch, means for increasing the tension in the second spring to return the shaft to zero speed position by said front wheel contacting the second road switch, means for depressing the shaft by closing the second road switch, and means for tabulating the speed of the vehicle passing from the first road switch to the second road switch when the shaft is moved to its depressed position.

12. In speed registering apparatus for registering the speed of a passing object, in combination, a pair of initiating devices spaced apart along the path of the moving object, a frame, a rotatably and axially movable shaft mounted in the frame, spring means for rotating the shaft in speed registering direction by the object passing one of the initiating devices, further spring means for rotating the shaft in the opposite direction by the object passing the other initiating device, a solenoid which when energized will move said shaft downwardly, a series of segments fixed to the frame, each segment representing a speed in miles per hour of the object passing from one to the other of the initiating devices, a series of tabulators each marked for a different speed and each electrically connected to a complemental segment for the corresponding speed, an arm fixed to the shaft and having a contact point which contacts one of said segments when the shaft is depressed, a pair of separable contact points which are moved together when the object passes said one of the initiating devices, means for energizing the solenoid when the object passes said other initiating device, and means for maintaining said solenoid energized from the time the object passes said other initiating device until said contact points separate.

13. Speed registering apparatus as claimed in claim 12, in which said last mentioned means includes a further pair of contact points that are closed when the shaft is depressed, a source of electricity, and a circuit including said source of electricity, both of said pairs of contact points and said solenoid, which circuit is broken when said first mentioned pair of contact points are separated.

14. In speed tabulating apparatus for tabulating the speed of a passing object, in combination, a first initiating device, a second initiating device spaced along the path of the moving object a predetermined distance from the first initiating device, a frame, a rotatably and axially movable shaft mounted in the frame, means for rotating the shaft in one direction by the object passing the first initiating device, further means for rotating the shaft in the opposite direction by the object passing the second initiating device, means for moving the shaft axially by the object passing the second initiating device, a series of segments fixed to the frame, each segment representing a different speed of the objects passing from the first to the second initiating device, a series of tabulators each marked for a different speed and each electrically connected to a complemental segment for the corresponding speed, an arm fixed to the shaft and having a contact point which contacts a segment when the shaft is moved axially, a source of electricity, and an electrical circuit including the source of electricity, the second initiating device, said means for moving the shaft axially, said arm, said segments, and the tabulators, whereby the tabulators will record the speed of an object passing from the first to the second initiating devices.

References Cited in the file of this patent

UNITED STATES PATENTS

| | | |
|---|---|---|
| 2,181,728 | Greentree | Nov. 28, 1939 |
| 2,251,250 | Keen | July 29, 1941 |
| 2,361,826 | Dowden | Oct. 31, 1944 |
| 2,657,749 | Dowden | Nov. 3, 1953 |